(12) United States Patent
Sui

(10) Patent No.: US 11,198,810 B2
(45) Date of Patent: Dec. 14, 2021

(54) SCALE INHIBITION IN HIGH PRESSURE AND HIGH TEMPERATURE APPLICATIONS

(71) Applicant: BL Technologies, Inc., Minnetonka, MN (US)

(72) Inventor: Caroline Chihyu Sui, Trevose, PA (US)

(73) Assignee: BL TECHNOLOGIES, INC., Minnetonka, MN (US)

( * ) Notice: Subject to any disclaimer, the term of this patent is extended or adjusted under 35 U.S.C. 154(b) by 104 days.

(21) Appl. No.: 16/483,072

(22) PCT Filed: Feb. 27, 2017

(86) PCT No.: PCT/US2017/019570
§ 371 (c)(1),
(2) Date: Aug. 2, 2019

(87) PCT Pub. No.: WO2018/156155
PCT Pub. Date: Aug. 30, 2018

(65) Prior Publication Data
US 2019/0375980 A1    Dec. 12, 2019

(51) Int. Cl.
*E21B 37/06* (2006.01)
*C09K 8/528* (2006.01)
*E21B 43/24* (2006.01)
*E21B 43/26* (2006.01)

(52) U.S. Cl.
CPC ............ *C09K 8/528* (2013.01); *E21B 37/06* (2013.01); *E21B 43/24* (2013.01); *E21B 43/26* (2013.01)

(58) Field of Classification Search
None
See application file for complete search history.

(56) References Cited

U.S. PATENT DOCUMENTS

| 3,617,578 | A | * | 11/1971 | Stanford | .................. C02F 5/14 |
| | | | | | 210/700 |
| 5,062,962 | A | | 11/1991 | Brown et al. | |
| 5,147,555 | A | | 9/1992 | Brown et al. | |
| 5,248,438 | A | * | 9/1993 | Perez | ..................... C23F 11/08 |
| | | | | | 210/698 |

(Continued)

FOREIGN PATENT DOCUMENTS

| CA | 2758686 A1 | 5/2013 |
| CN | 101913712 A | 12/2010 |
| WO | 2014003942 A1 | 1/2014 |

OTHER PUBLICATIONS

International Search Report and Written Opinion dated Jul. 28, 2017 in International Appl. No. PCT/US2017/019570; 15 pages.

*Primary Examiner* — Andrew Sue-Ako
(74) *Attorney, Agent, or Firm* — Armstrong Teasdale LLP

(57) ABSTRACT

Methods are provided to inhibit scale formation in oil or gas production systems. In one embodiment, the scale inhibiting treatment comprises: A) an AAA terpolymer and B) a polycarboxylate such as a polyepoxy succinic acid (PESA). The treatment can be added to these systems in the well area itself, to the well annulus and its associated tubes, casings, etc., to the oil or gas bearing subterranean formation, to injection conduits for injection of steam or fracking fluid to the subterranean formation, to the produced water, or to equipment in fluid contact with the produced water.

20 Claims, 2 Drawing Sheets

(56) References Cited

U.S. PATENT DOCUMENTS

| | | | |
|---|---|---|---|
| 5,370,799 A * | 12/1994 | Oddo | C09K 8/528 |
| | | | 137/7 |
| 5,409,062 A | 4/1995 | Brown et al. | |
| 6,641,754 B2 | 11/2003 | Buentello et al. | |
| 7,094,852 B2 | 8/2006 | Solov et al. | |
| 8,236,734 B1 | 8/2012 | Shen et al. | |
| 8,366,915 B2 | 2/2013 | Goliaszewski et al. | |
| 8,728,324 B2 | 5/2014 | Meskers, Jr. et al. | |
| 2010/0292106 A1 | 11/2010 | Sanders et al. | |
| 2010/0307753 A1* | 12/2010 | Rey | C09K 8/68 |
| | | | 166/305.1 |
| 2012/0028856 A1 | 2/2012 | Herve et al. | |
| 2014/0190692 A1 | 7/2014 | Hibbeler et al. | |

* cited by examiner

SCALE INHIBITION IN HIGH PRESSURE AND HIGH TEMPERATURE APPLICATIONS

CROSS-REFERENCE TO RELATED APPLICATION

This application is a national phase of International Patent Application No. PCT/US2017/019570 filed Feb. 27, 2017, which is incorporated herein by reference in its entirety.

FIELD OF INVENTION

The invention pertains to methods for inhibiting scale formation in oil and gas brines. In some embodiments, the methods are useful in inhibiting calcium based scale formation in oilwell brines that contain dissolved iron.

BACKGROUND OF THE INVENTION

Steam is used to recover heavy oil in many geologic formations. In these formations, steam is required to increase the mobility of oil within the formation. Steam is injected into the subterranean formation that contains the oil. The steam condenses, resulting in an oil/water mixture that is gathered by an oil/water gathering well, through which the oil/water mixture is pumped to the surface. Typically, the oil/water mixture is sent to an oil/water separator in which the desired oil is separated from the water and recovered for sale. The produced water stream, after separation of the oil, is further de-oiled in a de-oiling process step. In many operations, the produced water is subjected to further downstream treatments including softeners, filters, ion-exchange systems, evaporators, and the like until it is ready to report to a steam generator that produces steam again for injection into the oil bearing subterranean formation.

In natural gas production, pressurized liquid fracking solutions are injected into the subterranean formation. These solutions contain primarily water and proppants that are suspended in the water via thickening agents and the like. This solution breaks up rocky deposits in the formation. Since the gas is lighter than the fracking solution, it rises to the top of the well for recovery. Again, brine containing water suspensions or solutions are produced and need to be treated for water discharge or further use of the recovered water in the process such as in feedwater to the fracking pumps.

Scale formation in oil or gas wells and associated equipment is a serious problem. Brine laden water produced during oil or gas production is referred to as "produced water" and is the source of scale formation in the well itself and in associated casing, tubing, pipes, and valves. This scale formation is also of concern in equipment used to process or transport the produced water.

The produced water contains high concentrations of alkaline earth metal cations such as calcium, strontium, and barium, and anions including carbonate, bicarbonate, and sulfate.

Additionally, iron ions exist extensively in oil and gas wells, production flow lines and in the produced water. These ions remain commonly as ferrous ($Fe^{2+}$) due to the anaerobic condition during oil or gas production processes. In some cases, scale control chemical treatments that are designed primarily to inhibit calcium carbonate, calcium sulfate, barium sulfate and strontium sulfate scale deposits are rendered ineffective or less effective as the Fe ions tend to preferentially adsorb onto the functional groups present in such chemical treatments. In this regard, problems have been reported in conjunction with traditional phosphonate and acrylate scale control agents. Additionally, if the produced water contains high concentration of Ca (i.e., higher than 1,000 mg/L), Ca-phosphonate and Ca-acrylate precipitates are formed thereby exacerbating the scaling problem.

Over time, and if left untreated, scale deposit formation can reduce fluid flow and heat transfer functions and promote corrosion and bacterial growth. As the deposits grow, production rates decrease, and the entire operation may need to be shut down for cleaning and scale removal operations.

SUMMARY OF THE INVENTION

In accordance with one aspect of the invention, methods are provided for inhibiting scale formation in oil or gas production systems. The method comprises adding to the system a water soluble or dispersible polymer (A) having the formula I

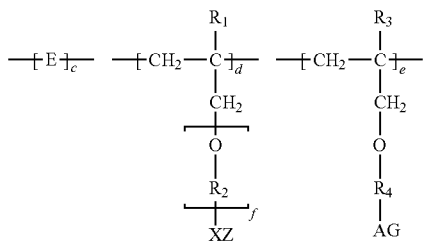

wherein E is the repeat unit remaining after polymerization of an ethylenically unsaturated compound, preferably a carboxylic acid, sulfonic acid, phosphonic acid, or amide form thereof or mixtures thereof; $R_1$ is H or lower alkyl ($C_1$-$C_4$);

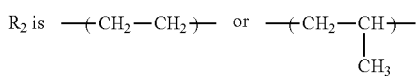

or $-(CH_2-CH_2-CH_2-)$; f is an integer of about 1-100, preferably from about 1-20, X and A are independently selected and are an anionic group selected from $OSO_3$, $SO_3$, $PO_3$, $OPO_3$, or COO; G and Z are independently selected and are chosen from H or a cationic group such as Na, K, or $NH_4$; $R_3$ is H or lower alkyl ($C_1$-$C_4$), and $R_4$ is a hydroxyl substituted alkylene radical having from 1 to about 6 carbon atoms.

Subscripts c, d, and e represent the molar amounts of the monomer repeat units in the polymer. In one exemplary embodiment, c is from about 1-80; d is about 0-30; and e is about 0-30 with the proviso that at least one of d and e must be present, and c+d+e=100. In other embodiments, c is from about 1-80; d is from about 1-30; and e is from about 1-30, wherein c+d+e=100.

Additionally, the treatment comprises adding (B) a polycarboxylate polymer to such system.

As used herein, polycarboxylate polymer designates homopolymers, co-polymers, and terpolymers wherein at least some of the repeat units comprise carboxyl functionality or water soluble salts of carboxyl groups. Exemplary polycarboxylate polymers include acrylic acid and methacrylic acid polymers, copolymers, and terpolymers, polymaleic acid polymers, copolymers and terpolymers and polyepoxysuccinic acid (PESA) polymers.

Oil or gas production systems produce a brine laden aqueous product defined as "produced water". In some of the methods, the combined treatment of (A) and (B) is added to the produced water to inhibit scale formation in conjunction with equipment, conduits, etc., that are in contact with the produced water. In some embodiments, the produced water may comprise a calcium content of 500 mg/L and an Fe content of 100 mg/L or greater. In some embodiments, calcium may be present in an amount of 10,000 mg/L. Further, in some embodiments, the produced water has a temperature of 90° C. and higher and is under a pressure of 1 Atm and greater. In some cases, the pressure may be about 500 psig or greater.

In some embodiments, the scale inhibiting treatment is fed to the produced water in an amount of about 0.1-100 mg/L (combined A and B) of produced water.

In certain instances, the polymer component (A) of the combined scale inhibiting treatment comprises repeat units of i) acrylic acid or salt, ii) allylalkoxylated ether or water soluble salt, and iii) allylhydroxylated alkyl ether or water soluble salt thereof. Such polymer is sometimes hereinafter referred to as an AAA terpolymer. In some instances, the polymer (A) may be a terpolymer of i) acrylic acid or salt, ii) allylpolyethoxy (10) sulfonate, and iii) allylhydroxypropylsulfonate ether.

In some embodiments, the combined scale inhibiting treatment is added to the well bore itself or to equipment in fluid communication with the well such as in associated casings, tubings, conduits, and the like. In other embodiments, the scale inhibiting treatment may be added to the subterranean oil or gas bearing formation that is a component of the oil or gas production system. In some cases, the scale inhibiting treatment may be added to steam or to fracking fluid or the like that is in fluid communication with the subterranean oil or gas bearing formation.

In certain embodiments of the invention, the combined treatment (i.e., A and B) is useful in inhibiting Ca carbonate and/or iron carbonate.

DETAILED DESCRIPTION

Figure 1:
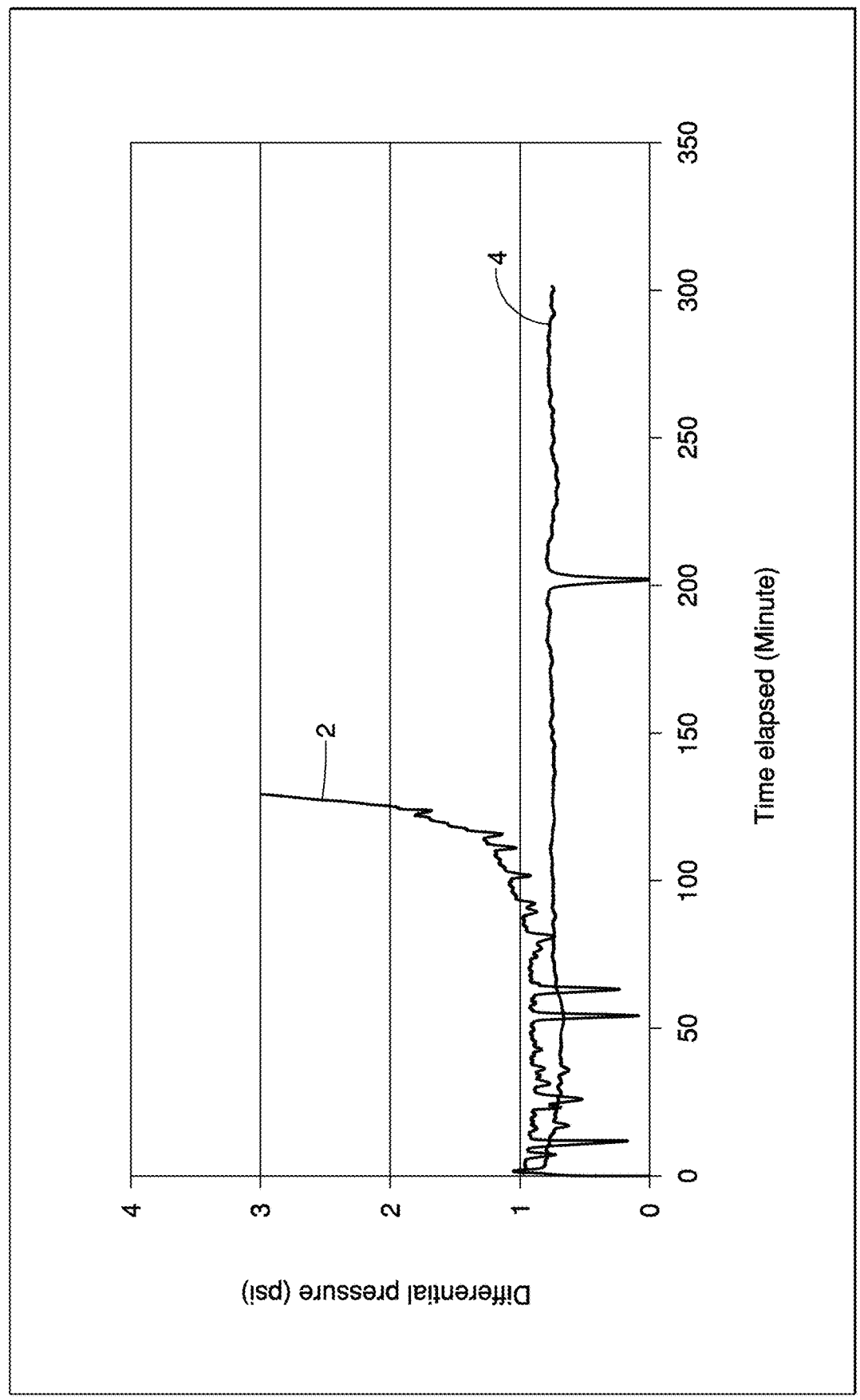
FIG. 1 is a graph showing results of a dual scale loop test wherein no inhibitor is present contrasted with the results attendant upon use of a scale control treatment of the invention.

In accordance with on exemplary embodiment, a chemical scale control treatment is added to an oil or gas production system. The treatment can, for example, be added to the well bore itself, or to casings, tubes, or the like in communication with the well. In one embodiment, the treatment is added to a subterranean oil or gas bearing formation that is in fluid flow contact with the well. In some cases, the treatment may be added to the injection steam or fracking fluid. The wells may be treated with the scale inhibiting treatment chemicals either as a batch job, with continuous treatment down the annulus or through a feed string, or by a squeeze treatment. A squeeze treatment is a common oil field practice for treating subterranean formations to inhibit scale formation. In a squeeze treatment, a scale inhibitor treatment is injected or squeezed into the reservoir formation. The scale inhibitor forced into the formation is either absorbed by the reservoir mineral, becomes phase trapped or precipitates in the formation. When the well is placed back into production, the inhibitor is slowly produced back into the well bore with the produced water to inhibit scale formation.

In other embodiments, the treatment is added to the produced water upstream from or to operations that require flow or treatment of the produced water therein, such as: (1) an oil/water separator; (2) an oil/gas/water separator; (3) a gas/water separator; (4) a de-oiling station; (5) filter and/or membrane separation units; (6) flotation systems; (7) softener units; (8) ion exchange systems; (9) heat exchangers; (10) reverse osmosis systems; and (11) evaporators, etc.

By use of the phrase "oil or gas well systems", we mean to define treatment addition sites such as the aforementioned along with any other locations in which treatment addition will result in contact of the treatment with the scale imparting anions and cations in such systems.

In some embodiments, the treatment is added to produced waters of the type having a Ca content of 10.000 mg/L or greater and an Fe content of 100 mg/L or greater. In some embodiments, temperature of the produced water will be 90° C. and higher under pressures of 500 psig and higher. The treatment has been found effective in inhibiting $CaCO_3$ and $FeCO_3$ scale formation. Additionally, the treatment is devoid of Phosphorus, thus lending itself to an overall low or non Phosphorus solution to oil and gas well scale control treatment.

The scale inhibiting treatment compositions of the invention include a water soluble or water dispersible polymer (I). Generally, the polymer treatment (I) to be added to the water is a polymer represented by the structure:

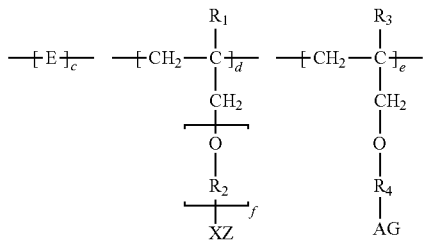

wherein E is the repeat unit remaining after polymerization of an ethylenically unsaturated compound, preferably a carboxylic acid, sulfonic acid, phosphonic acid, or amide form thereof or mixtures thereof; $R_1$ is H or lower alkyl $(C_1$-$C_4)$;

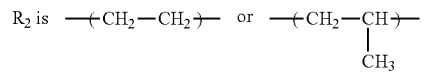

or $-(CH_2-CH_2-CH_2)-$; f is an integer of about 1-100, preferably from about 1-20, X and A are independently selected and are an anionic group selected from $OSO_3$, $SO_3$, $PO_3$, $OPO_3$, or $COO$; G and Z are independently selected and are chosen from H or a cationic group such as Na, K, or $NH_4$; $R_3$ is H or lower alkyl $(C_1$-$C_4)$, and $R_4$ is a hydroxyl substituted alkylene radical having from 1 to about 6 carbon atoms.

Subscripts c, d, and e represent the molar amounts of the monomer repeat units in the polymer. In one exemplary embodiment, c is from about 1-80; d is about 0-30; and e is about 0-30, with the proviso that at least one of d and e is present, and c+d+e=100. In other embodiments, c is from about 1-80, d is from about 1-30, and e is from about 1-30, wherein c+d+e=100.

The molecular weight of the polymer treatments is not critical but preferably, in one embodiment, falls within the range of about Mw 1,000-1,000,000.

In one aspect of the invention, the polymer comprises a terpolymer of i) acrylic acid or water soluble salt thereof; ii) allylalkoxylated ether or water soluble salt thereof; and iii) allylhydroxylated alkyl ether or water soluble salts thereof (AAA terpolymer). In other embodiments, the terpolymer comprises acrylic acid or salt thereof as repeat unit E; allylethoxy (10) sulfonate as repeat unit d, and allylhydroxypropylsulfonate ether as the repeat unit e. This particular terpolymer may be made in accordance with the method set forth in Example 3 of U.S. Pat. No. 6,641,754. The disclosure of this patent is incorporated by reference herein. In accordance with this example, deionized water, allyloxy-2-hydroxypropane-3-sulfonic acid and ammonium allyl polyethyoxy-(10)-sulfate monomer are charged to a reaction flask. The solution is heated to 85° C. while being sparged with $N_2$. An initiator of 2,2'-azobis (2-amidino propane) hydrochloride is used, and the initiator and acrylic acid are added to the reaction flask over a 3.5 hour period. The solution is then heated to 95° C. and maintained at that temperature for two hours. The reaction medium is then cooled and caustic added.

As a second component, the scale inhibiting treatment includes a polycarboxylate polymer.

As used herein, polycarboxylate polymer designates homopolymers, co-polymers, and terpolymers wherein at least some of the repeat units comprise carboxyl functionality or water soluble salts of carboxyl groups. Exemplary polycarboxylate polymers include acrylic acid and methacrylic acid polymers, copolymers, and terpolymers, polymaleic acid polymers, copolymers and terpolymers and polyepoxysuccinic acid (PESA) polymers.

Especially noteworthy are the PESA polymers having the general formula

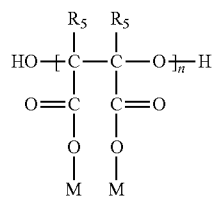

where n ranges from about 2 to 50, preferably 2 to 25; M is hydrogen or a water soluble cation such as $Na^+$, $NH_4^+$, or $K^+$; and $R_5$ is hydrogen, $C_{1-4}$ alkyl, or $C_{1-4}$ substituted alkyl. Preferably, $R_5$ is hydrogen. The use of PESA as a scale control agent in aqueous systems as well as a method of preparing PESA is described in U.S. Pat. Nos. 5,062,962 and 5,147,555 incorporated herein by reference.

Generally, the combination of AAA and PESA may be fed to the oil and gas well system in a liquid carrier solution or suspension such as in an aqueous carrier solution in a weight ratio of 1-5 parts AAA: 1-2 parts PESA. In some embodiments, the weight ratio of AAA:PESA may be about 1-2 parts AAA per part of PESA. In some aspects of the invention, the combined treatment (i.e., AAA and PESA) will be admitted to the oil and gas well system in an amount of about 0.1-100 mg/L of the produced water. In some systems, the AAA may be fed at a rate of about 10-20 mg/L with the PESA fed at an amount of about 5-10 mg/L.

Examples

In order to assess the efficacy of the scale inhibiting composition of the invention, a dynamic scale loop (DSL) apparatus was employed. This device is available from Process Measurement and Control Systems, Aberdeen U.K.

The DSL apparatus is designed to study the precipitation and deposition of scale at reservoir and pipeline conditions of pressure and temperature. It is used to evaluate the efficiency of chemical inhibitors to prevent the formation of mineral scales such as calcium carbonate, calcium sulfate, and barium sulfates. It allows one to determine the minimum inhibitor concentration (MIC) required to prevent the deposition of scale and to perform comparative tests with different inhibitors under the same conditions. The system uses the principle of the tube blocking test, which is an industry standard, to determine the minimum inhibitor concentration in dynamic flow conditions at required temperature and pressure. Inhibitor efficiency is measured by the ratio of the time needed to block the tube in the presence of inhibitor divided by the time needed to block the tube without inhibitor.

In accordance with the standard tube blocking tests, anionic and cationic brines are supplied separately through preheated coils to a capillary tube coil that is submerged in a constant temperature liquid bath or oven.

Testing solution is fed into the loop system from containers, one containing cationic and the other anionic ions. The treatment product is added to either one or in a separate container containing anionic or cationic solution. The pressure and temperature are set based on testing requirements.

The core component of the system is the capillary test coil installed inside a constant temperature oven. The coil is made of 316 stainless steel (UNS S31600). The diameter of the coil is about 0.88 mm, and the length is about 1 meter.

The anionic and cationic solutions are preheated in the pre-heating coils, then flow through the testing coil. When scale forms inside the coil, the pressure across the capillary coil will increase. A pressure meter records continuously the pressure and maps pressure changes over time.

Features of the System:
Pressure: up to 3.000 psi
Fluid Flow Rate: up to 10 ml/min
Temperature Accuracy: 0.1° C.
Water Chemistry, Testing Method/Condition and Test Results The testing solution was synthetically made using deionized water with addition of chemicals. An anionic solution and cationic solution were made separately, and the mixture of the two solutions at 1:1 ratio produced the desired water chemistry composition. The key components of the test water are given in Table 1.

The anionic and cationic solutions were purged with 97% $N_2$ and 3% $CO_2$ continuously to remove dissolved oxygen and control pH. Dissolved oxygen concentration was measured continuously using a dissolved oxygen meter. When dissolved $O_2$ concentration was lower than 10 ppb (0.00 mg/L on the meter) ascorbic acid was added to both solutions to further reduce $O_2$ concentration. Then, ferrous chloride ($FeCl_2.4H_2O$) is added to cationic solution. $N_2$ and $CO_2$ gases are continuously purged during the entire period of testing to ensure an anaerobic environment and to maintain pH.

TABLE 1

Synthetic Test Water for Dynamic Scale Loop Test

| Ions | Concentration of Ions (mg/L) |
|---|---|
| Calcium | 10,300 |
| Magnesium | 780 |
| Iron | 170 |
| Chloride | 16% |
| Sodium | 19% |
| Bicarbonate | 195-400 |

The anionic and cationic solution were pumped at 5 mL/minute each. The differential pressure was measured online. An increase in differential pressure indicates the formation of scale inside the testing coil. The dosage of the inhibitor was adjusted by varying between the inhibitor free anionic solution and the inhibitor containing anionic solution.

Test results are shown in FIG. 1 wherein the control test is represented by 2 and scale inhibition treatment of the invention is designated by line 4, as shown in FIG. 1. Without inhibitor, differential pressure started increasing in 90 minutes and reached 3 psi in 130 minutes. With treatment 4, the differential pressure was kept constant and exhibited no sign of increasing after 300 minutes. Test conditions for the FIG. 1 test were 96° C., 700 psig, 170 mg/L Fe, 192 mg/L $HCO_3$. Treatment 4 is (A) 20 ppm of acrylic acid Na salt (AA)/ammonium allyl polyethoxy (10) sulfate (AAPES)/allyl 2-hydroxypropyl sulfonate ether (AHPSE) terpolymer and (B) 10 ppm polyepoxy succinic acid (PESA). The terpolymer (A) has the following molar ratio of repeat units (AA) 73.6%/(AAPES) 11%/(AHPSE) 15.4%. The $\overline{M}w$ of the terpolymer is ≈12,000. The molar ratio of monomers is AA=76.3%; AAES 11%; AHPSE 15.4%.

Figure 2:
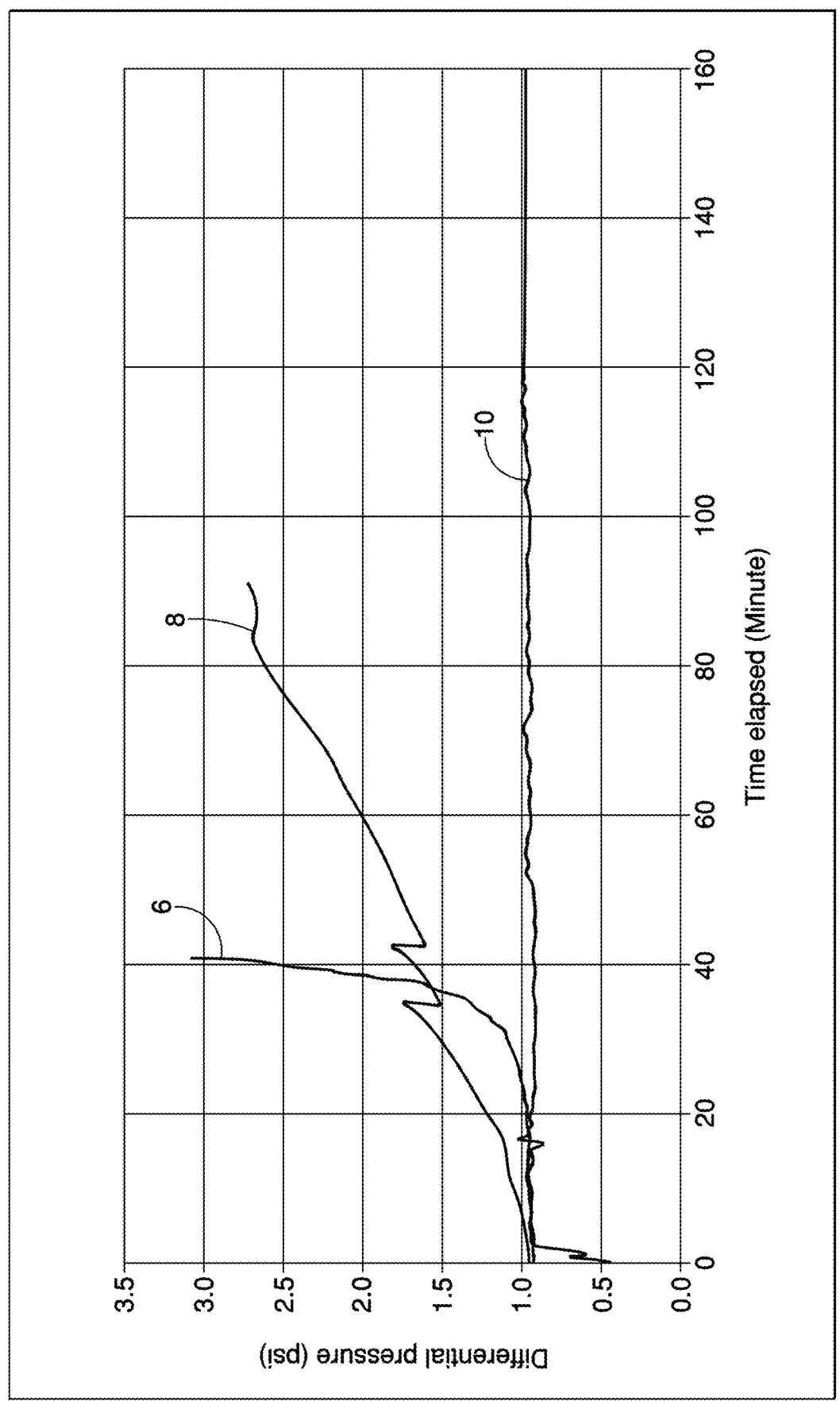
FIG. 2 is a graph showing results of another dual scale loop test comparing a control treatment wherein no inhibitor is present contrasted with the results attendant upon use of a scale control treatment of the invention.

Another test was run with the DSL wherein the test conditions were similar to those reported in conjunction with FIG. 1, except that $HCO_3$ was present in an amount of 400 mg/L. Results are shown in FIG. 2 wherein 6 is the control test, 8 is 30 ppm PESA, and 10 is the same treatment as reference number 4 from FIG. 1.

While the embodiments of this invention have been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

The invention claimed is:

1. A method of inhibiting scale formation in an oil or gas production system comprising adding to said system a scale inhibiting treatment comprising:
   (A) a water soluble or dispersible terpolymer comprising repeat units of i) acrylic acid or salt, ii) allylpolyethoxy (10) sulfonate, and iii) allylhydroxypropylsulfonate ether; and
   (B) a polyepoxy succinic acid (PESA).

2. The method as recited in claim 1, wherein the terpolymer comprises 1-80 molar amounts of i) acrylic acid or salt, 1-30 molar amounts of ii) allylpolyethoxy (10) sulfonate, and 1-30 molar amounts of iii) allylhydroxypropylsulfonate ether.

3. The method as recited in claim 1, wherein a brine laden aqueous product is produced in said system, defining produced water and said scale inhibiting treatment is fed to said produced water in an amount of about 0.1-100 mg/L (combined A and B) of said produced water.

4. The method as recited in claim 1, wherein the scale inhibiting treatment has a weight ratio of 1-5 parts of the terpolymer to 1-2 parts PESA.

5. A method of inhibiting scale formation in an oil or gas production system comprising iron ions, the method comprising adding to said system a scale inhibiting treatment comprising:
   (A) a water soluble or dispersible terpolymer comprising repeat units of i) acrylic acid or salt, ii) allylpolyethoxy (10) sulfonate, and iii) allylhydroxypropylsulfonate ether; and
   (B) a polycarboxylate polymer comprising a polyepoxysuccinic acid polymer (PESA).

6. The method as recited in claim 5, wherein the terpolymer comprises 1-80 molar amounts of i) acrylic acid or salt, 1-30 molar amounts of ii) allylpolyethoxy (10) sulfonate, and 1-30 molar amounts of iii) allylhydroxypropylsulfonate ether.

7. The method as recited in claim 6, wherein a brine laden aqueous product comprising iron ions is produced in said system, defining produced water, said method comprising adding said scale inhibiting treatment to said produced water.

8. The method as recited in claim 7, wherein said produced water comprises an Fe content from 3 mg/L to 170 mg/L.

9. The method as recited in claim 8, wherein said produced water has a temperature from 90° C. to 96° C. and is under a pressure from 1 Atm to 3000 psig.

10. The method as recited in claim 9, wherein said pressure is from 500 psig to 3000 psig.

11. The method as recited in claim 7, wherein said produced water has a Ca content from 500 mg/L to 10,300 mg/L.

12. The method as recited in claim 11, wherein said Ca content is from 2,000 mg/L to 10,300 mg/L.

13. The method as recited in claim 7, wherein said scale inhibiting treatment is fed to said produced water in an amount of about 0.1-100 mg/L (combined A and B) of said produced water.

14. The method as recited in claim 5, wherein said scale inhibiting treatment is added to a well.

15. The method as recited in claim 14, wherein said scale inhibiting treatment is added to a casing or tube in operative association with said well.

16. The method as recited in claim 5, wherein said scale inhibiting treatment is added to a subterranean oil or gas bearing formation that is a component of said oil or gas production system.

17. The method as recited in claim 16, wherein said scale inhibiting treatment is added to steam or a fracking fluid that is in fluid communication with said subterranean oil or gas bearing formation.

18. The method as recited in claim 5, wherein said scale inhibiting treatment is added to produced water from said oil or gas production system.

19. The method as recited in claim 5, wherein said scale is calcium carbonate.

20. The method as recited in claim 5, wherein said scale is iron carbonate.

* * * * *